J. KEEFE.
JOINT FOR ELECTRICAL DEVICES.
APPLICATION FILED AUG. 31, 1907.
934,670.
Patented Sept. 21, 1909.
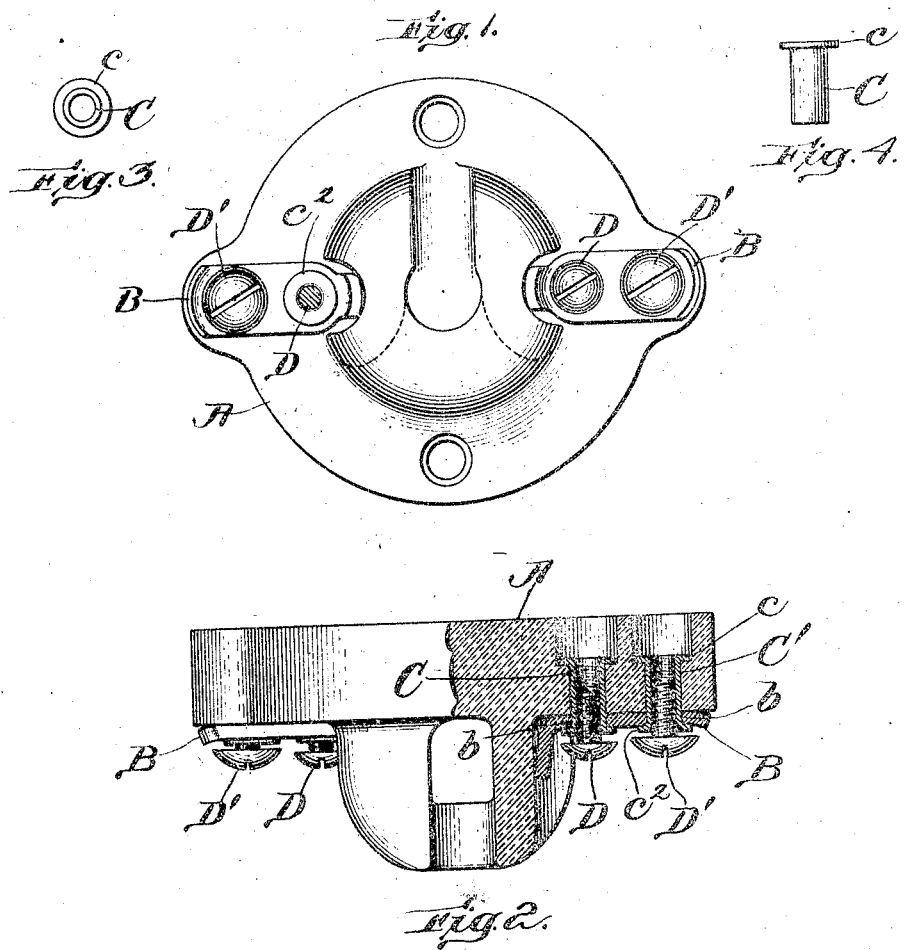

UNITED STATES PATENT OFFICE.

JOSEPH KEEFE, OF BOSTON, MASSACHUSETTS, ASSIGNOR TO CHARLES S. KNOWLES, OF NEW BEDFORD, MASSACHUSETTS.

JOINT FOR ELECTRICAL DEVICES.

934,670.   Specification of Letters Patent.   Patented Sept. 21, 1909.

Application filed August 31, 1907. Serial No. 390,669.

*To all whom it may concern:*

Be it known that I, JOSEPH KEEFE, of Boston, in the county of Suffolk and State of Massachusetts, have invented a new and useful Joint for Electrical Devices, of which the following is a specification.

My invention relates to that class of electrical devices which have a coupling member attached to a support, the coupling member being used to connect two conductors.

The objects of my invention are mainly to make a firmer and more secure fastening of the coupling to the support; to provide greater electrical conductivity between the coupling member and the conductor; to eliminate expense in manufacture; and to economize space.

My invention is a joint for electrical devices in which the member which fastens the coupling to the support is fixed and coöperates with the means for connecting one of the conductors to the coupling member.

In the drawings Figure 1 is a plan view of a rosette embodying my invention; Fig. 2 is a side elevation of the same partly in section; and Figs. 3 and 4 are details.

I have shown my invention embodied in a rosette for supporting a hanging electric lamp.

In the drawings A is the base of the rosette usually made of porcelain or other insulating material, and this base constitutes the support above referred to.

B is the coupling member which is made of conducting material and is of the usual form except that the two holes through it are not threaded and are closer together than has heretofore been practical.

C C' are the two studs of conducting material for fastening the coupling member to the support and D D' are two screws for connecting the two conductors with the coupling member. Each of the studs C C' is made at its inner end with a flange c constituting the head of the stud which engages the support. Also the shank of each stud is made hollow with interior screw threads, the outer end of the stud extending through one of the holes b of coupling member B and being headed over or upset to provide a flange c² which engages the coupling member B. The open ends of the studs receive the screws D and D' by which the two conductors are connected to the coupling member.

Among the advantages of my joint it will be noticed that I economize space for my fastener and for the means connecting the coupling and conductor; that I do away with hand screwing of the coupling to its support; and that I provide a much larger contact surface between the coupling member and the means which connects that member with the conductor than heretofore, because the stud engages the screw D or D' practically throughout its entire length whereas in joints for similar purposes as heretofore constructed only a small portion of the screw surface engaged the coupling member B into which it was screwed directly.

It will be clear that the fastening device may be widely varied in form.

What I claim is:

1. A joint for electrical devices comprising a support; a coupling member to electrically connect two conductors; a fixed fastening member holding the coupling member to the support; and means coöperating with the fastening member to connect one of the two conductors to the coupling member.

2. A joint for electrical devices comprising a support; a coupling member to electrically connect two conductors; a pair of fixed fastening members holding the coupling member to the support; means coöperating with the fastening member to connect one of the two conductors to the coupling member; and means coöperating with the other fastening member to connect the other conductor to the coupling member.

3. A joint for electrical devices comprising a support; a coupling member to electrically connect two conductors; a fixed fastening member holding the coupling member to the support consisting of a stud engaging the support at one of its ends its other end extending through the coupling member and being made hollow with interior screw threads; and a screw extending into and engaging the hollow end of the stud for connecting one of the two conductors to the coupling member.

4. A joint for electrical devices comprising a support; a coupling member to electrically connect two conductors; a fixed fastening member holding the coupling member to the support consisting of a stud engaging the support at one of its ends and the coupling member at its other end, the last mentioned end being made hollow and interiorly threaded; and a screw extending into and engaging the hollow end of the stud for connecting one of the two conductors to the coupling member.

5. A joint for electrical devices comprising a support; a coupling member to electrically connect two conductors; a pair of fixed fastening members holding the coupling member to the support each consisting of a stud engaging the support at one of its ends, its other end extending through the coupling member and being made hollow with interior screw threads; and a pair of screws for connecting the two conductors to the coupling member, each extending into and engaging the hollow end of one of the studs.

6. A joint for electrical devices comprising a support; a coupling member to electrically connect two conductors; a pair of fixed fastening members holding the coupling member to the support, each consisting of a hollow stud made with a head at one end to engage the support, its other end extending through the coupling member and headed over to engage the coupling member with the interior of that end interiorly screw threaded, and a pair of screws for connecting the two conductors to the coupling member; each extending into and engaging the hollow end of one of the studs.

JOSEPH KEEFE.

Witnesses:
M. G. HENNESSY,
ARTHUR F. RANDALL.